United States Patent
Kang et al.

(10) Patent No.: US 7,542,538 B2
(45) Date of Patent: Jun. 2, 2009

(54) CAPSULE ASSEMBLING APPARATUS FOR NEUTRON RE-IRRADIATION EXPERIMENTS

(75) Inventors: Young-Hwan Kang, Daejeon (KR); Jong-Kiun Kim, Daejeon (KR); Ki-Un Youm, Daejeon (KR); Ki-Byeong Yoon, Daejeon (KR); Myung-Hwan Choi, Daejeon (KR); Bong-Goo Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 220 days.

(21) Appl. No.: 11/112,303

(22) Filed: Apr. 21, 2005

(65) Prior Publication Data

US 2005/0286675 A1 Dec. 29, 2005

(51) Int. Cl.
*G21G 1/00* (2006.01)
(52) U.S. Cl. .................. 376/202; 376/340; 376/341; 376/342
(58) Field of Classification Search .............. 376/294, 376/340–345, 414, 202, 292, 403; 250/505.1, 250/507.1
See application file for complete search history.

(56) References Cited

U.S. PATENT DOCUMENTS

| 3,574,058 | A | * | 4/1971 | Gumuchian | 376/437 |
| 3,773,615 | A | * | 11/1973 | Blatter | 376/202 |
| 4,196,047 | A | * | 4/1980 | Mitchem et al. | 376/202 |
| 6,697,446 | B2 | * | 2/2004 | Kang et al. | 376/202 |

* cited by examiner

*Primary Examiner*—Rick Palabrica
(74) *Attorney, Agent, or Firm*—Bachman & LaPointe, P.C.

(57) ABSTRACT

The present invention relates generally to an apparatus of assembling a capsule for neutron-irradiation experiments. The capsule may contain test specimens to develop nuclear fuel, and may comprise a capsule main body and protection tube that may be assembled and disassembled using separate joining means. The present invention provides a capsule assembling apparatus that may enable safe and easy assembly/disassembly of the capsule placed at a given depth in a working pool through remote working. The capsule assembling apparatus may comprise a base structure loading the capsule main body, a guiding pipe of a given length extending from the base structure to provide a pathway through which the capsule main body is loaded on the base structure, a damper fixing the capsule main body to the guiding pipe, and a coupler coupling the capsule main body with the protection tube.

8 Claims, 16 Drawing Sheets

Fig. 10 - flowchart
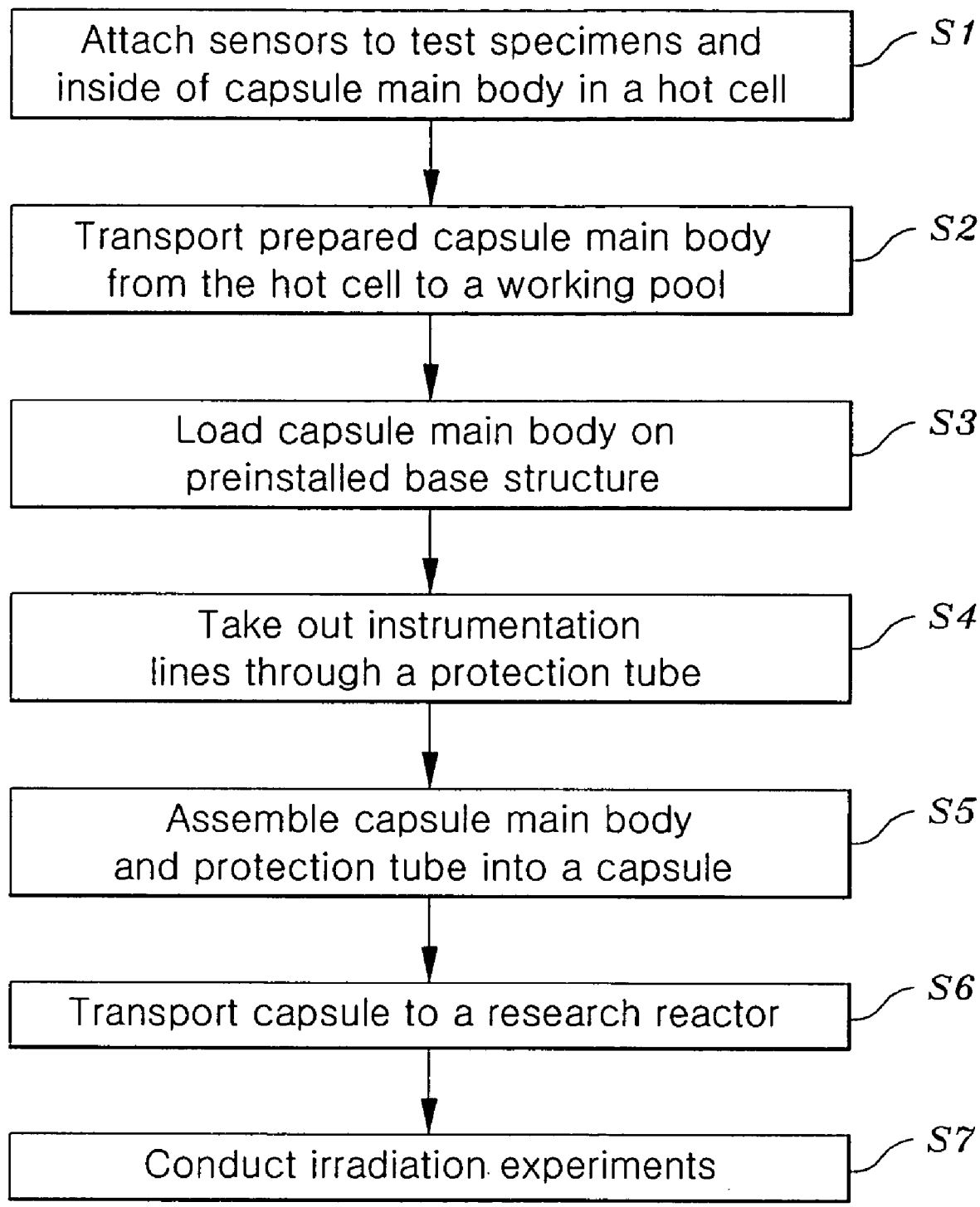

CAPSULE ASSEMBLING APPARATUS FOR NEUTRON RE-IRRADIATION EXPERIMENTS

BACKGROUND OF THE INVENTION

1. Field of the Invention

The present invention relates generally to a capsule assembling apparatus for neutron-irradiation experiments to develop nuclear fuel and, more particularly, to a capsule assembling apparatus that may enable safe and easy assembly of a capsule with remote working by utilizing clampers and couplers to assemble/disassemble a capsule main body containing test specimens and a protection tube protecting instrumentation lines from cooling water during neutron-irradiation experiments for developing new nuclear fuel in irradiation holes of a research reactor.

2. Description of the Related Art

Various irradiation experiments on nuclear fuel in the research reactors have been performed to assess the integrity of the nuclear fuel and develop new one for commercial nuclear reactors. Through these irradiation experiments characteristic data of the nuclear fuel, including high burn-up data or high rates of neutron irradiation data, are collected for performance analyses in comparison with existing nuclear fuel.

In the related art assembly steps, a capsule for collecting fuel characteristic data is usually assembled by welding a capsule main body and a protection tube together. The assembled capsule is transported to irradiation hole of a research reactor, and then used for irradiation experiments. The capsule assembled by welding may be applicable to the inactive nuclear fuel experiments.

However, the capsule assembled by welding may not be suitable for long-term neutron-irradiation experiments. Long-term exposure to neutron environments may cause radiation damage such as embrittlement of the structural materials of the capsule and lead to difficulties in reuse of the capsule, thereby bringing about the necessity of replacing the capsule with new one. The assembly by welding may make it almost impossible to disassemble manually the conventional capsule exposed highly to neutron environments and take the test specimens out of the capsules without dismantling of the capsule, thereby resulting in practical impossibility of nuclear fuel re-irradiation experiments.

Accordingly, the object of the present invention is to provide a capsule assembling apparatus that may enable safe and easy assembly/disassembly of capsules by utilizing clampers and couplers to assemble capsule main bodies and protection tubes. The capsules may be assembled with remote working using the capsule assembling apparatus within a service water pool at a depth enough to shield radioactivity, transported to the inside of research reactors, and utilized for fuel-irradiation experiments to develop nuclear fuel.

SUMMARY OF THE INVENTION

In order to achieve the object, the present invention provides an innovative apparatus for assembling a neutron re-irradiation capsule and a method of assembling the capsule using said apparatus.

According to the present invention, the capsule may contain within itself nuclear fuel specimens and one or more instrumentation sensors connected to external instrumentation and control systems via instrumentation lines and, comprise a capsule main body and protection tube joined together, and be scheduled for neutron-irradiation in an irradiation hole of the research or test reactor. For joining the capsule main body and protection tube together, the assembling apparatus may comprise: a base structure loading the capsule main body; a guiding pipe of a given length extending from the base structure to provide a pathway through which the capsule main body is loaded on the base structure; a clamper fixing the capsule main body to the guiding pipe; and a coupler coupling the capsule main body with the protection tube.

The clamper may fix the capsule main body to the guiding pipe by converting a vertically applied force into a horizontal force.

The clamper may comprise: a guiding pipe flange formed at the upper end of the guiding pipe and having one or more screw holes; a clamping screw having a head to be inserted into designated assembling tools, a screw part to be inserted into one of the screw holes of the guiding pipe flange, and a slant surface tapering from the head to the screw part with a designated angle; a push rod contacting with the slant surface of the clamping screw, and moving towards the capsule main body in proportion to insertion of the screw part into one of the screw holes of the guiding pipe flange; and a jaw formed at the end of the push rod near to the capsule main body.

The clamper may further comprise a push rod guide guiding the movement of the push rod.

The push rod may have a round end contacting with the slant surface of the clamping screw, and move horizontally in proportion to fastening of the clamping screw.

The protection tube may have a flange at a site interfacing with the upper surface of the capsule main body. The coupler may comprise: one or more screw taps formed at the upper surface of the capsule main body; screw holes penetrating the flange of the protection tube corresponding to the screw taps; and locking bolts joining the capsule main body and the protection tube by being inserted into the screw taps through the screw holes.

The coupler may further comprise a plurality of guide pins protruding from the upper surface of the capsule main body, and guide-pin holes penetrating the flange of the protection tube corresponding to the guide pins.

The apparatus may further comprise a circular gasket groove formed in the upper surface of the capsule main body, and a gasket to be inserted in the gasket groove.

The coupler may comprise an open pipe joint holder that includes a stopping protrusion formed at the middle of its inner periphery, a snap ring, a fixing member, a wire spring, and a metallic gasket, installed at its inner periphery sequentially from its one end to the other end, wherein the other end of the pipe joint holder may be fixed to the upper surface of the capsule main body and the protection tube may be combined through the one end with the capsule main body together via pressure application.

According to the present invention, for assembling the capsule main body and protection tube together, the method of assembling the capsule may comprise the steps of: (S1) installing one or more instrumentation sensors and test specimens within the capsule main body in a hot cell; (S2) transporting the capsule main body from the hot cell to a service water pool; (S3) installing the capsule main body in a guiding pipe preloaded for providing a guiding pathway to the capsule main body located on a base structure prearranged on the floor of the service water pool; (S4) firmly fixing the capsule main body to the guiding pipe using prepared clampers; (S5) transporting the protection tube from the outside of the working pool, and taking out instrumentation lines connected to the capsule main body through an instrumentation line hole formed at the lower end of the protection tube; and (S6) combining the capsule main body and the protection tube together using a coupler, wherein the clamping and coupling may be performed by remote working on the service water pool.

BRIEF DESCRIPTION OF THE DRAWINGS

FIG. 10 is a flowchart showing the steps to assemble a capsule for an irradiation experiment using the capsule assembling apparatus according to the present invention.

DETAILED DESCRIPTION OF EXAMPLE EMBODIMENTS OF THE INVENTION

Hereinafter, example embodiments of the present invention will be described in detail with reference to the accompanying drawings.

Figure 1:
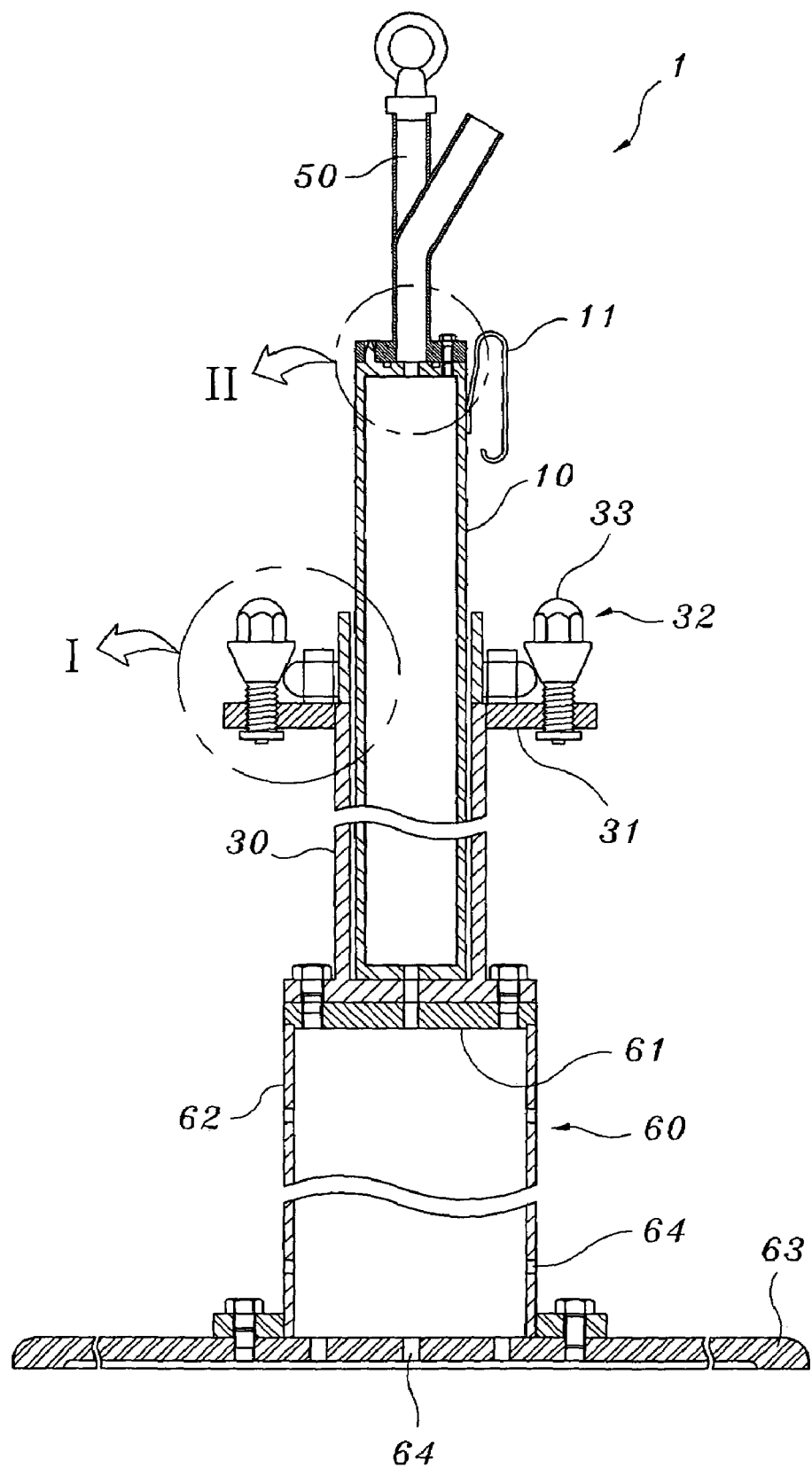
FIG. 1 is a schematic view showing an overview of a capsule assembling apparatus according to the present invention.

FIG. 1 is a schematic view showing an overview of a capsule assembling apparatus 1 according to the present invention. The capsule assembling apparatus 1 may comprise a clamper 32, a guiding pipe 30, and a base structure 60. A capsule may comprise a capsule main body 10 and a protection tube 50 coupled to each other.

The capsule main body 10 may have a cylindrical shape for installing test specimens 70, as targets for irradiation experiments, within its inside. Various instrumentation sensors (not shown) may be attached to the test specimens 70 and the inside of the capsule main body 10. Data measured by the instrumentation sensors may be transferred along instrumentation lines 71 through the protection tube 50 to external instrumentation and control systems (not shown).

The guiding pipe 30 may have a cylindrical shape, provide a pathway for installing the capsule main body 10 on the base structure 60, and extend vertically (substantially in a direction of gravity) from the base structure 60 to a predetermined length, e.g. about 10M. A guiding pipe flange 31 is equipped around the periphery of an upper part of the guiding pipe 30 so that the clamper 32 is installed. Preferably, the lower end of the guiding pipe 30 may be fixed to an upper plate of the base structure 60 by welding or bolts, and then the base structure 60 and a base plate 63 are coupled with coupling means such as bolts.

The protection tube 50 may be attached to the upper end of the capsule main body 10 and have a protection tube flange 51 formed at its lower end. The outer diameter of the protection tube flange 51 is almost the same as that of the capsule main body 10. The protection tube 50 substantially protect the instrumentation lines 71 extending from the instrumentation sensors attached to the test specimens 70 and the inside of the capsule main body 10, and provide an instrumentation line in-outlet 54 through which the instrumentation lines 71 are connected to the external instrumentation and control systems.

The base structure 60 may be installed to firmly fix the capsule main body 10 and comprise a capsule stand 61 formed under the capsule main body 10, a base stylobate 62 maintaining a stable assembly structure under the capsule stand 61, and the base plate 63 directly contacting with a wide floor.

Figure 2:
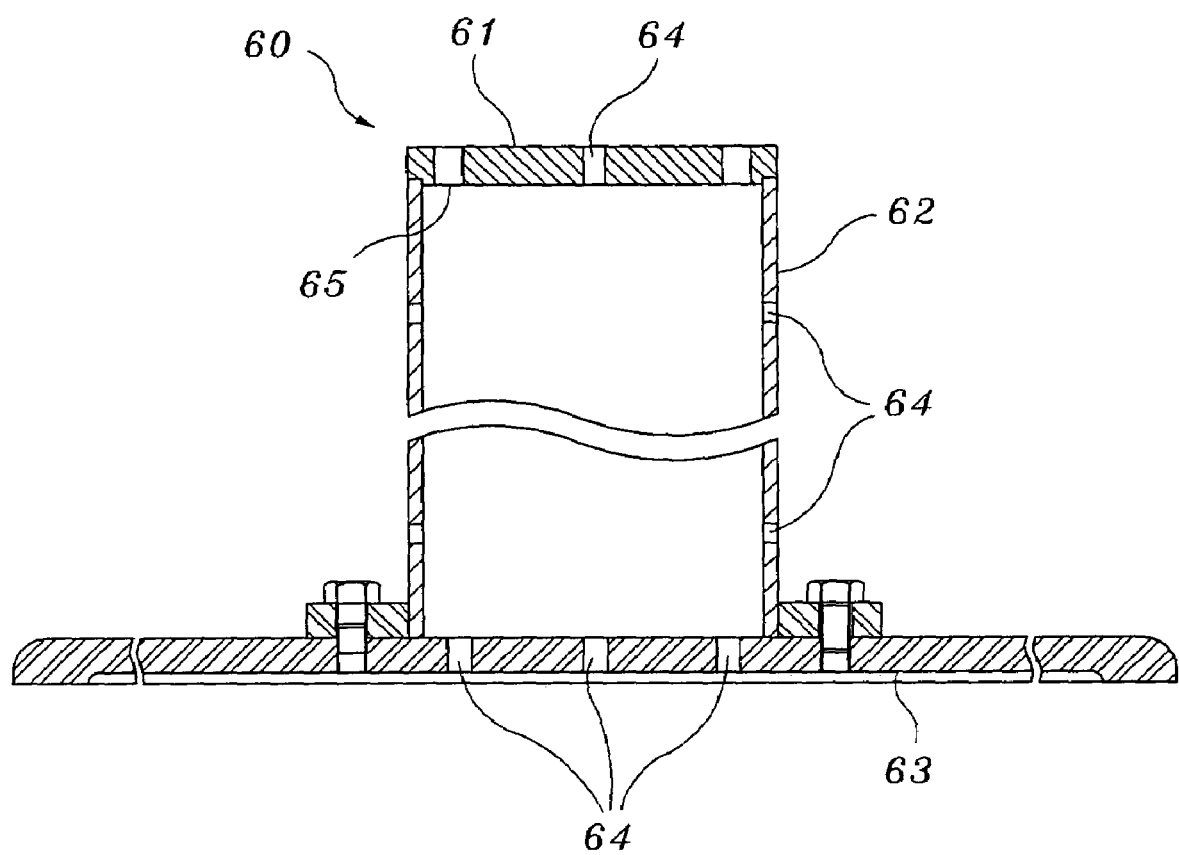
FIG. 2 is a sectional view showing a base structure of the capsule assembling apparatus of FIG. 1.

FIG. 2 is a sectional view showing the base structure 60 of the capsule assembling apparatus 1. The capsule main body 10 and protection tube 50 according to the present invention may be assembled/disassembled with remote working in a service water pool. It is necessary to maintain the stability of the capsule assembling apparatus 1 without rocking movement during their assembly and disassembly steps. It may therefore be preferable that the capsule assembling apparatus 1 is designed to have the base structure 60 comprising the capsule stand 61, base stylobate 62, and base plate 63. At least one drain hole 64, through which water flowed in drains up when taking the capsule assembling apparatus 1 out of the service water pool, may be formed at predetermined sites (preferably, including the centers) of the capsule stand 61 and the base stylobate 62.

Figure 3A:
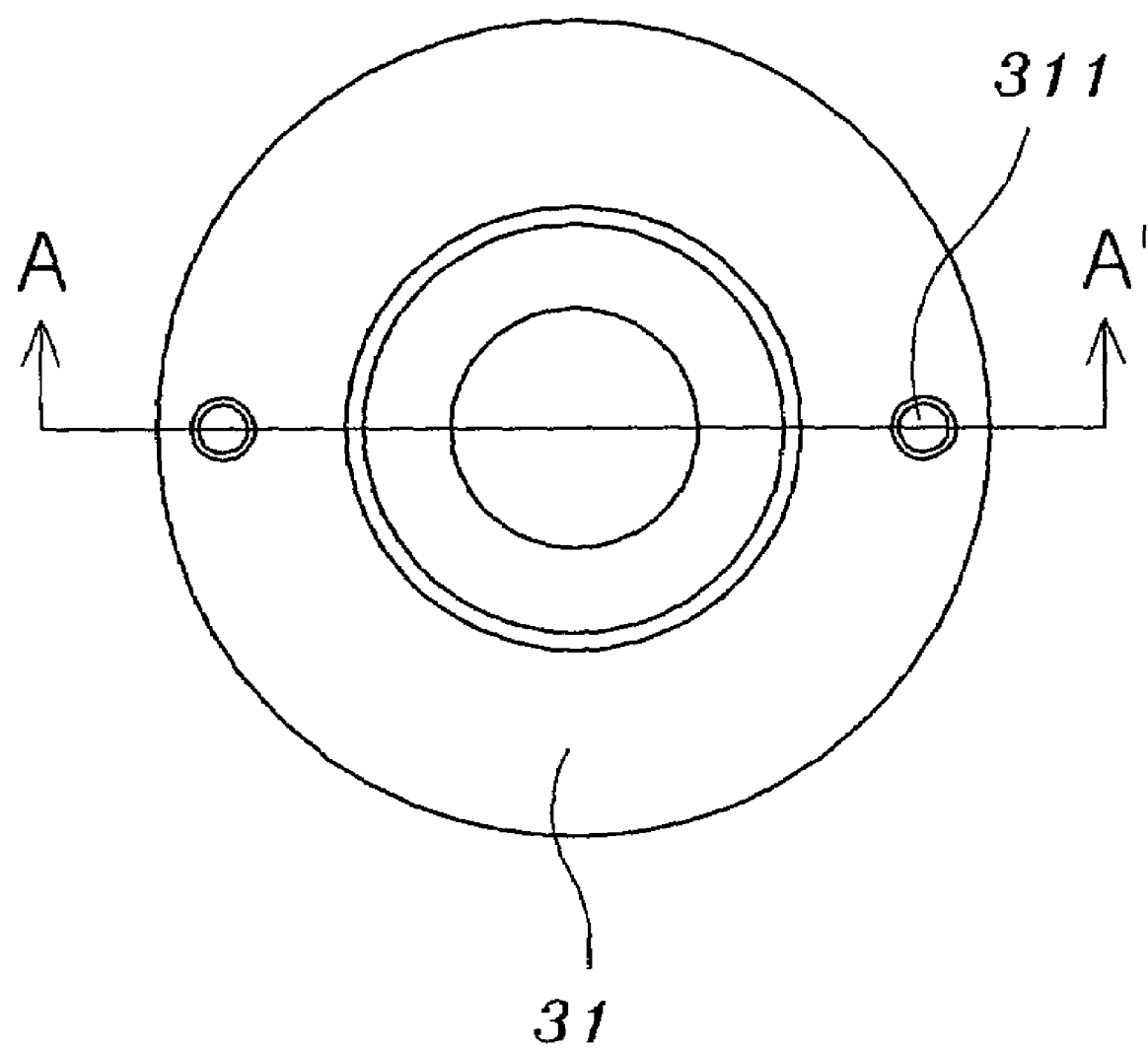
FIG. 3A is a plan view showing a guiding pipe of the capsule assembling apparatus of FIG. 1.
Figure 3B:
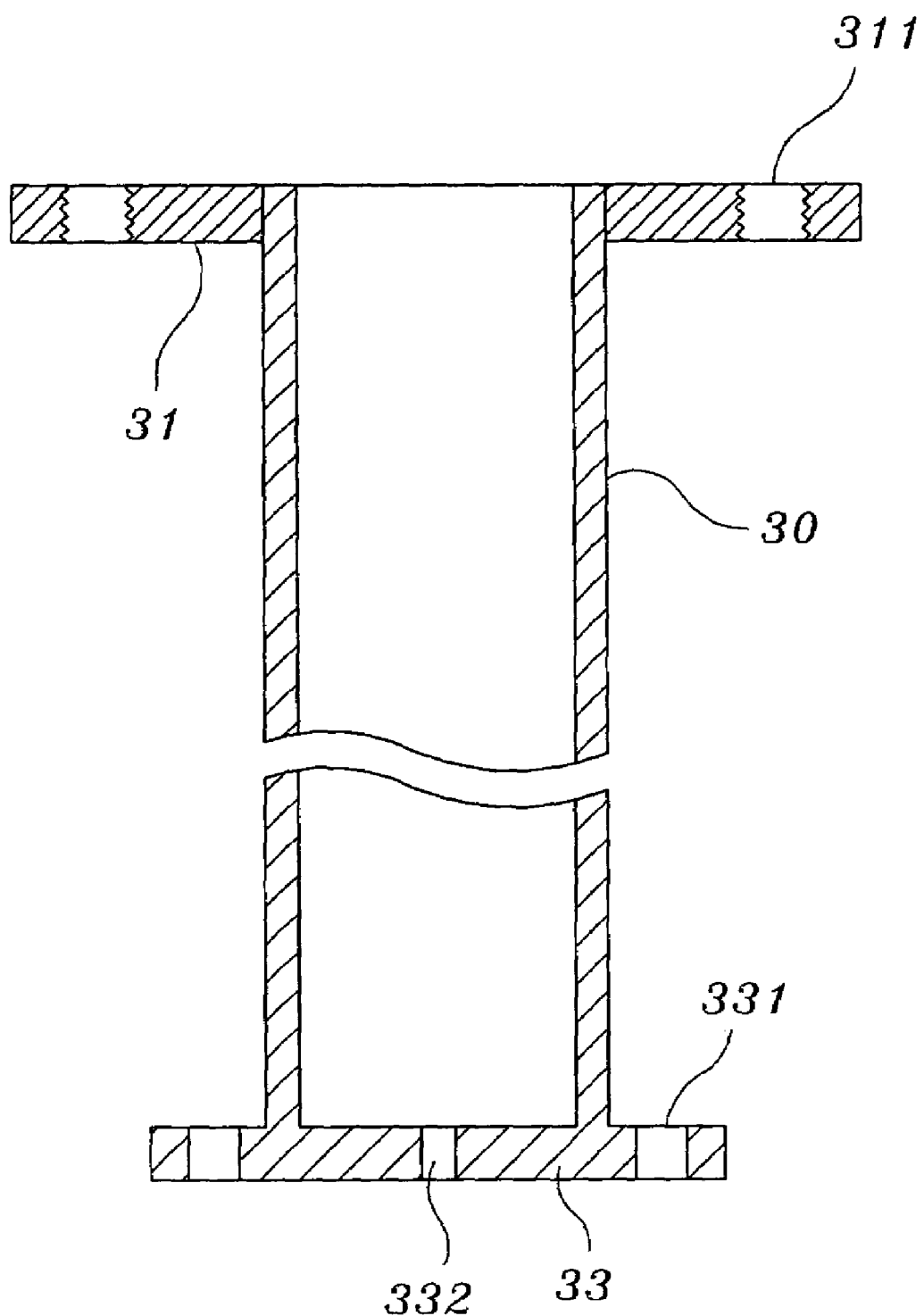
FIG. 3B is a sectional view showing the guiding pipe taken along the direction of A-A' in FIG. 3A.
Figure 3C:
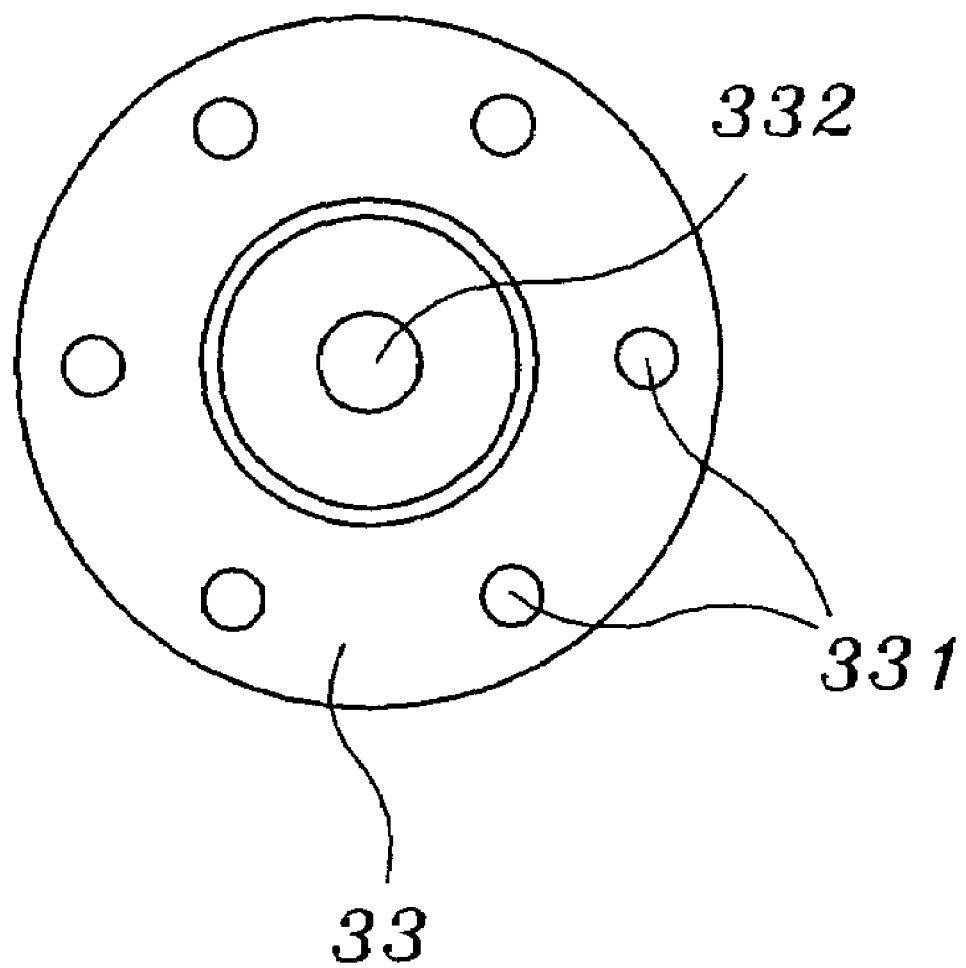
FIG. 3C is a bottom view showing the guiding pipe of FIG. 3A.

FIG. 3A is a plan view showing the guiding pipe 30 of the capsule assembling apparatus 1 of FIG. 1; FIG. 3B is a sectional view showing the guiding pipe 30 taken along the direction of A-A' in FIG. 3A; and FIG. 3C is a bottom view showing the guiding pipe 30. The guiding pipe 30 may comprise the guiding pipe flange 31 at its upper end, and a guiding pipe plate 33 at its lower end. Clamping screw holes 311 may be formed in the guiding pipe flange 31 so that clamping screws 321 of the clampers 32 are inserted into them. The clamping screw holes 311 may be formed at opposite sites along the diameter of the guiding pipe flange 31 so that the clampers 32 apply forces to and fix the capsule main body 10 from opposite directions each other. As another embodiment the three of four clamping screw holes 311 may be formed at equiangular sites one another.

The guiding pipe plate 33 may be used for fixing the guiding pipe 30 to the base structure 60, have at least two bolt holes 331 at predetermined sites, and have a drain hole 332 at its center, through which water is drained while taking the capsule assembling apparatus 1 out of the service water pool.

Figure 4A:
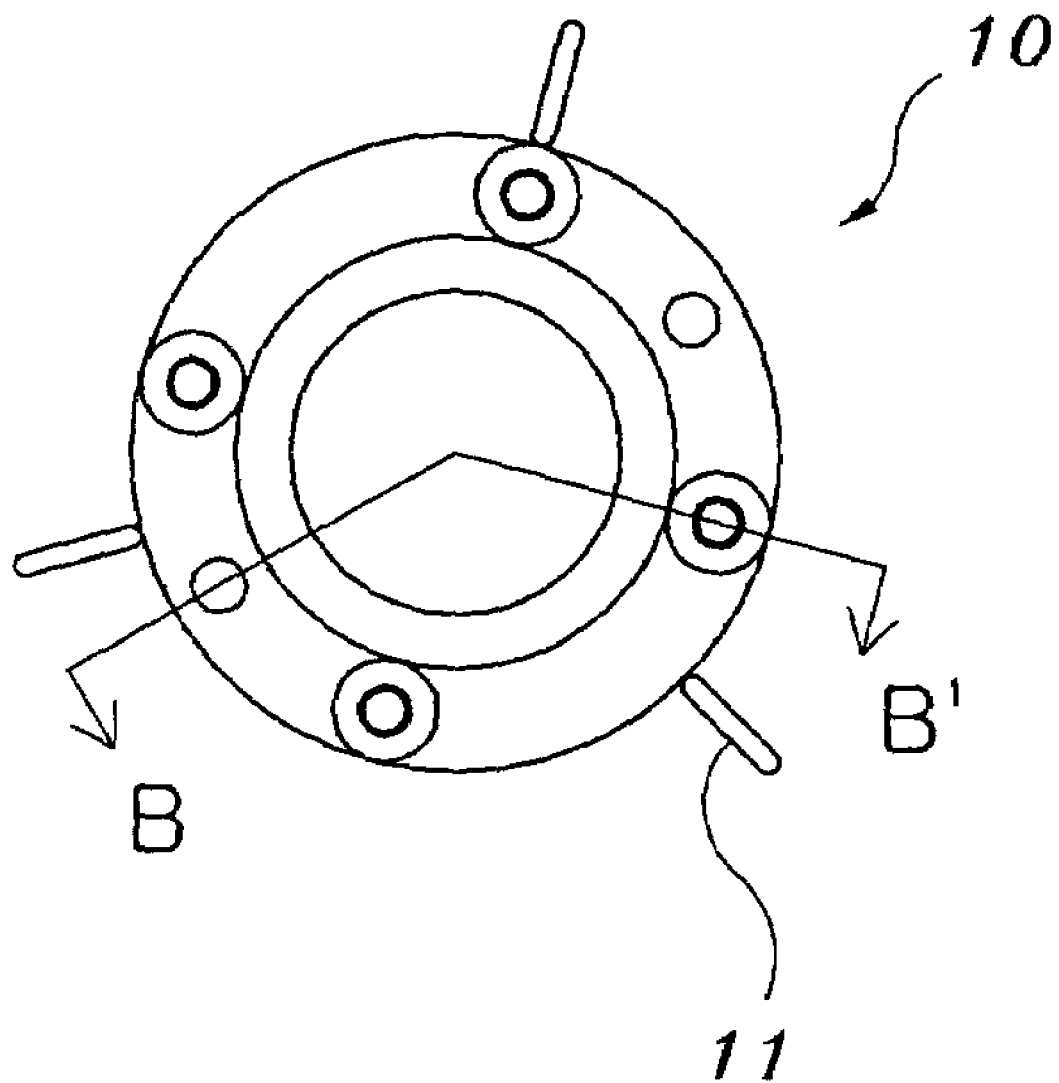
FIG. 4A is a plan view showing the upper end of a capsule main body shown in FIG. 1.
Figure 4B:
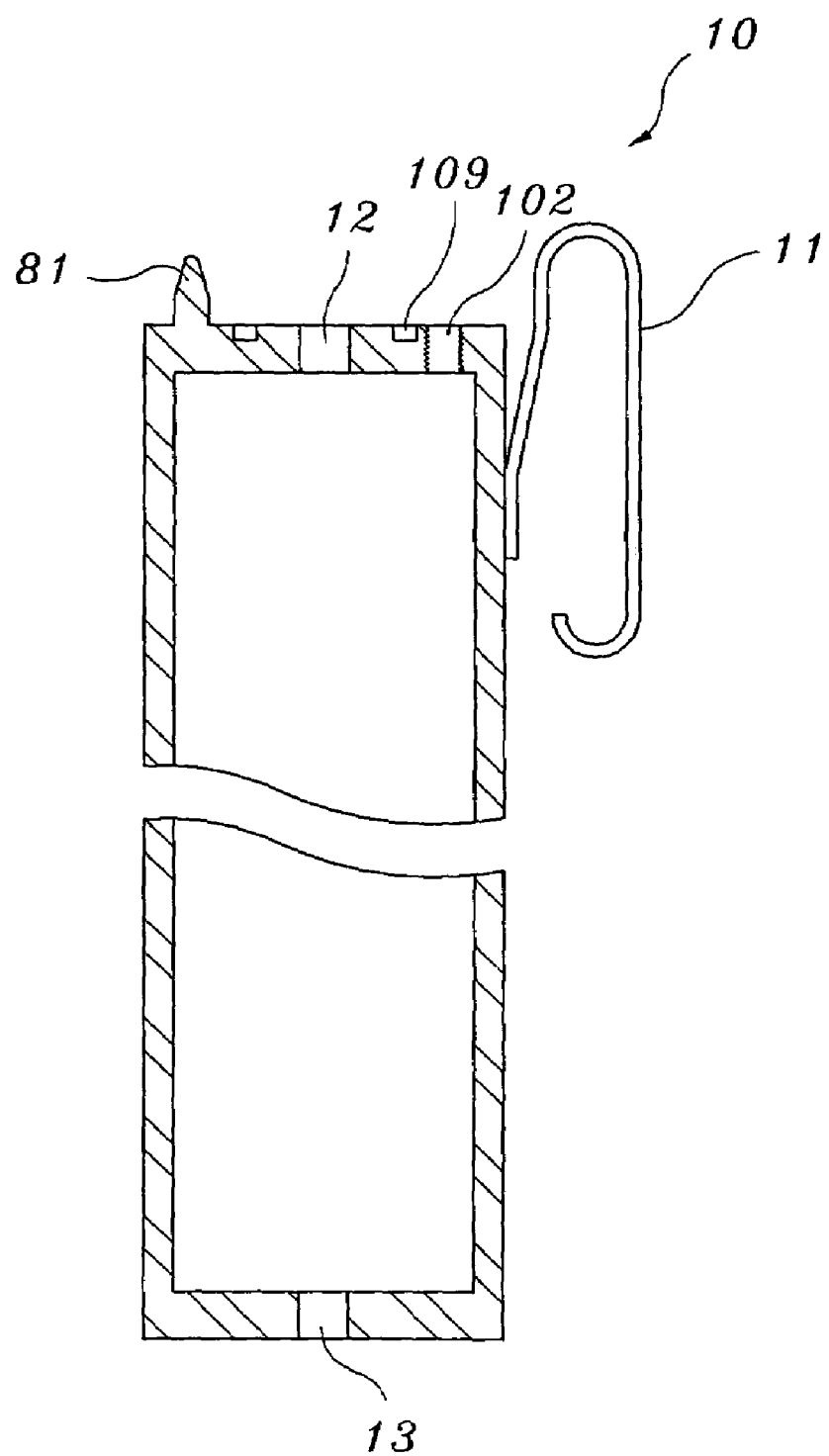
FIG. 4B is a sectional view showing the capsule main body taken along the direction of B-B' in FIG. 4A.

FIG. 4A is a plan view showing the capsule main body 10; and FIG. 4B is a sectional view showing the capsule main body 10 taken along the direction of B-B' in FIG. 4A. The capsule main body 10 has a pipe structure sealed with upper and lower flanges. The upper flange may comprise (preferably four or more) screw taps 102 into which locking bolts 103 of couplers 100 (those are explained later) are inserted, one or more protruding guide pins 81, and an instrumentation line hole 12 formed at its central region. The lower flange may comprise one or more drain holes 13 if necessary.

In addition, the capsule main body 10 may comprise at its side one or more, preferably three capsule lugs 11 enabling easy transport of the capsule with remote working using a capsule transporting tool 75, which is explained later. Preferably, the capsule lugs 11 may be formed at equiangular sites around the capsule main body 10.

In relation to a bolt coupler 100, to prevent inflow of the cooling water to the inside of the capsule in irradiation holes, a metallic gasket 108 may be installed between the capsule main body 10 and protection tube 50. A gasket groove 109 corresponding to the gasket 108 may also be formed on the upper surface of the capsule main body 10, for easy and stable accommodation of the gasket 108. It may be preferable that the inside of the gasket 108 is made of none-asbestos material and the outside is made of a metal such as aluminum. The gasket 108 may also be made of other materials such as synthetic resin that are capable of both preventing inflow of the cooling water and sufficiently enduring neutron irradiation.

Figure 5A:
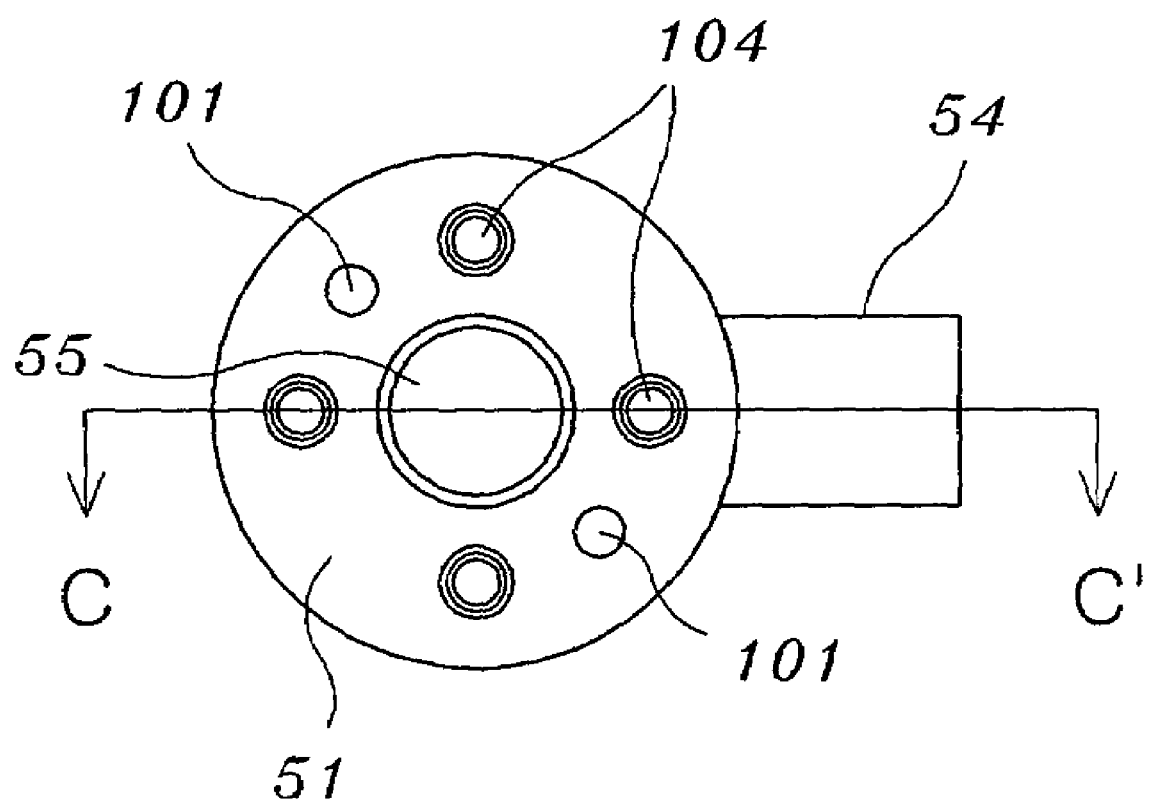
FIG. 5A is a bottom view showing a protection tube shown in FIG. 1.
Figure 5B:
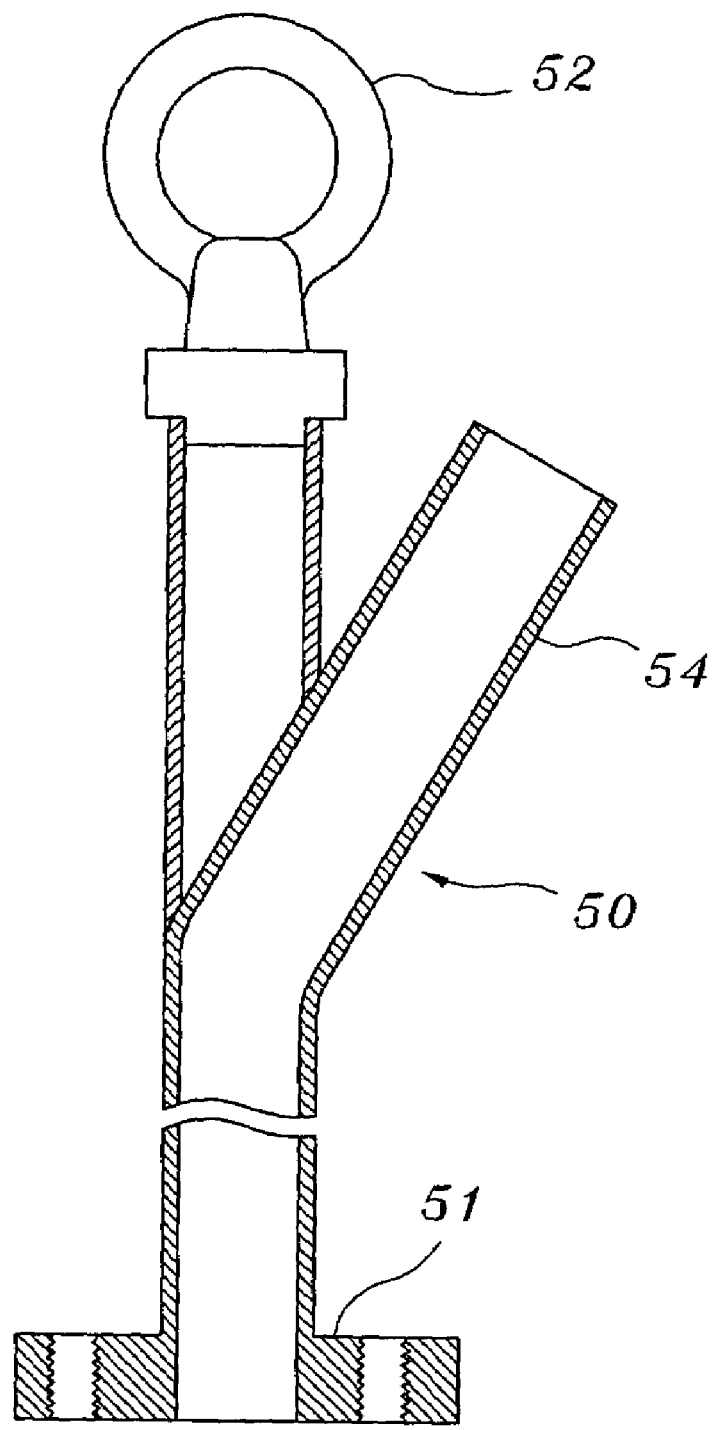
FIG. 5B is a sectional view showing the protection tube taken along the direction of C-C' in FIG. 5A.

FIG. 5A is a bottom view showing the protection tube 50 of FIG. 1; and FIG. 5B is a sectional view showing the protection tube 50 taken along the direction of C-C' in FIG. 5A. The protection tube 50 may comprise at its lower end of the protection tube flange 51, which may have screw holes 104 corresponding to the screw taps 102 formed in the upper flange of the capsule main body 10. At least a portion of the screw holes 104 may be treated with tapping. With this tapping, when the locking bolts 103 are coupled with the screw taps 102 through the screw holes 104, the locking bolts 103 may be first temporally coupled with the screw holes 104 and the protection tube flange 51 may be placed on the upper flange of the capsule main body 10, and then the locking bolts 103 are completely coupled with the screw taps 102. Considering the remote assembly of the capsule main body 10 and protection tube 50 in the reactor pool, this feature may contribute to overcoming difficulties in the assembly steps caused by the detachment of the locking bolts 103 from working tools.

The protection tube flange 51 may comprise one or more guide pin holes 101 corresponding to the guide pins 81 formed on the upper end of the capsule main body 10.

The protection tube 50 may have an instrumentation line hole 55 at its lower end, through which the instrumentation lines 71 extending from the capsule main body 10 are connected to the external instrumentation and control systems outside the reactor. The upper portion of the protection tube 50 may be bent and extended with a predetermined bending angle so that a vertical protection tube knob 52 is formed. The protection tube knob 52 may be formed at the upper end of the protection tube 50, and be used for transporting the capsule.

Figure 6:
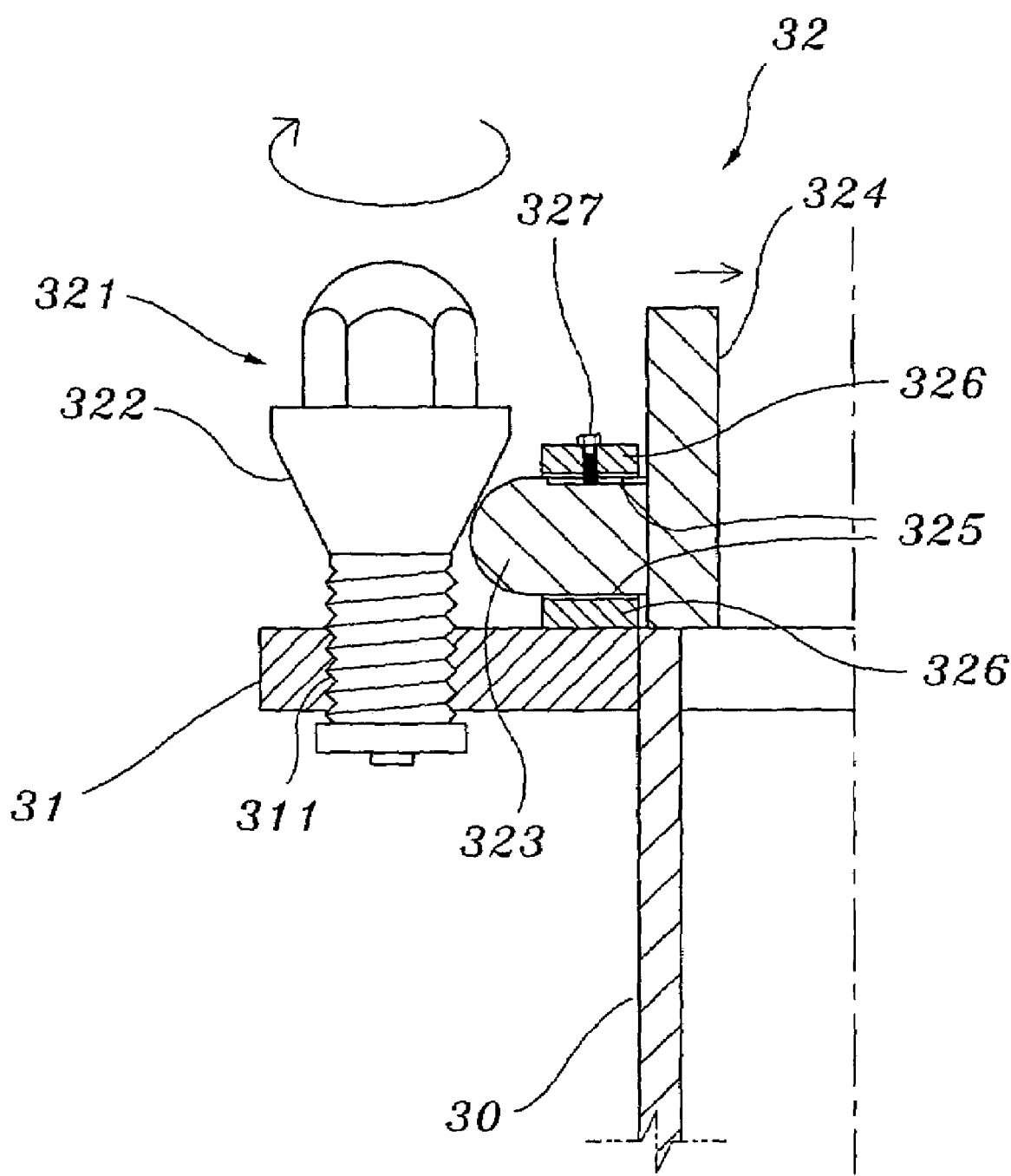
FIG. 6 is a partially enlarged view showing an overview of a clamper indicated by (I) in FIG. 1.

FIG. 6 is a partially enlarged view showing an overview of the clamper 32 (indicated by a letter I in FIG. 1). At least two clampers 32 may be equipped at the guiding pipe flange 31 formed around the periphery of the upper end of the guiding pipe 30. The clampers 32 may fix the capsule main body 10 installed within the guiding pipe 30. Preferably, three clampers 32 may be utilized, and be installed at equiangular sites of the guiding pipe flange 31. Namely, n clampers 32 may be installed in the guiding pipe flange 31 with 360°/n degree intervals between one another.

Each clamper 32 may comprise a clamping screw 321, a push rod 323, a jaw 324, and a push rod guide 326. The clamping screw 321 may comprise a head part to be inserted into assembly tools, a screw part to be inserted into the clamping screw hole 311 of the guiding pipe flange 31, and a slant surface 322 tapering from the head part to the screw part with a designated angle. The push rod 323 may come into direct contact with the slant surface 322 of the clamping screw 321. The jaw 324 may be attached to one end of the push rod 323, and be moved with the push rod 323 as one body. The push rod guide 326 may come into direct contact with the upper and lower ends of the push rod 323, and guide horizontal movement of the push rod 323.

The horizontal movement of the push rod 323 under the guidance of the push rod guide 326 may lead to the corresponding horizontal movement of the jaw 324, which applies a force to the capsule main body 10 and fix it using frictional force. Namely, the clampers 32 may convert vertical forces into horizontal forces, and firmly fix the capsule main body 10 to the guiding pipe 30. In the case of the M20×2.5p clamping screw 321 of the clamper 32, the clamping screw 321 may move up or down 2.5 mm per one rotation; and with an angle of 23° for the slant surface 322 of the clamping screw 321, the push rod 323 moves horizontally 1 mm per one rotation of the clamping screw 321.

A horizontally extending key groove 325 of as lot shape may be formed in the upper surface of the push rod 323. A stopping screw 327 formed to penetrate the push rod guide 326 downwardly may be placed approximately at the middle the upper region of the push rod 323. When the push rod 323 is horizontally guided along the push rod guide 326, the stopping screw 327 may prevent derailment of the push rod 323 from the push rod guide 326 and facilitate sliding movement of the push rod 323 along the key groove 325.

The slant surface 322 of the clamping screw 321 tapers down from the head part to the screw part. The end of the push rod 323 directly contacting with the slant surface 322 may be treated round, thereby facilitating the horizontal movement of the push rod 323 corresponding to the vertically applied force by the clamping screw 321. The end of the push rod 323 directly contacting with the slant surface 322 may also be treated in other shapes, if the push rod 323 may be easily moved horizontally corresponding to the downward movement of the clamping screw 321. In addition, the push rod 323 and jaw 324 of the clamper 32 may be formed as a monolithic body.

As another embodiment of the present invention, a stopping screw 327 formed to penetrate the push rod 323 may be placed approximately at the middle of the lower region of the push rod 323, and a horizontally extending key groove 325 of a slot shape may be formed in the lower surface of the push rod guide 326 installed above the push rod 323, thereby allowing the sliding movement of the push rod 323.

It may be preferable that the base structure 60, guiding pipe 30, guiding pipe flange 31, clamper 32, and protection tube 50 of the capsule assembling apparatus 1 according to the present invention are made of stainless steel.

Figure 7:
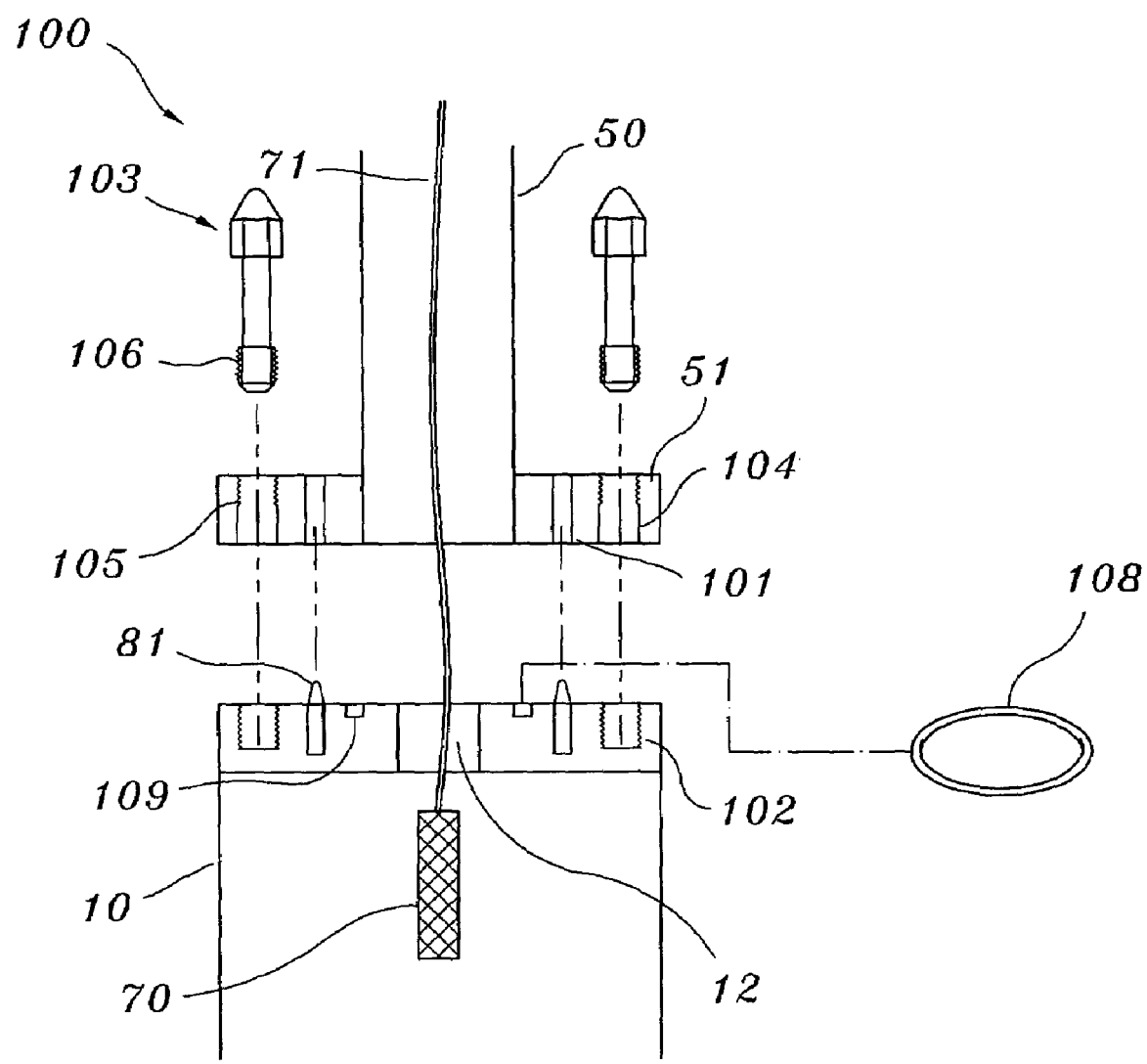
FIG. 7 is a partially enlarged view showing an overview of a coupler, indicated by (II) in FIG. 1, coupling the capsule main body with the protection tube using bolts.

FIG. 7 is a partially enlarged view showing an overview of the bolt coupler 100 (indicated by a letter II in FIG. 1), which couples the capsule main body 10 with the protection tube 50 using bolts. The bolt coupler 100 may comprise one or more guide pins 81, screw taps 102, screw holes 104, guide pin holes 101, and locking bolts 103. The guide pins 81 may be formed at a designated distance from the central axis of the upper flange of the capsule main body 10, and vertically protrude from the upper flange. The screw taps 102 may be formed outside of the guide pins 81. The guide pinholes 101 may be formed to penetrate the protection tube flange 51. The screw holes 104 penetrating the protection tube flange 51 may be formed outside of guide pin holes 101 corresponding to the screw taps 102. The locking bolts 103 may be coupled with the screw taps 102 and the screw holes 104.

It is preferable to form the guide pins 81 at equal intervals between one another along the same circumference of a circle centered at the upper flange of the capsule main body 10. Similar explanations may also be applicable to the screw taps 102 and the screw holes 104. Male screws may be formed only on designated lower portions of the locking bolts 103; and female screws may be formed only on designated upper portions of the screw holes 104 in the protection tube flange 51.

In the present embodiment, the guide pins 81 are formed in the upper flange of the capsule main body 10, and the corresponding guide pinholes 101 are formed in the protection tube flange 51. The reverse may also be applicable. Namely, the guide pins 81 may be formed in the protection tube flange 51 and the corresponding guide pin holes 101 may be formed in the upper flange of the capsule main body 10, thereby guiding the coupling between the capsule main body 10 and the protection tube 50.

The guide pins 81 and guide pin holes 101 may both improve alignment between the capsule main body 10 and the protection tube 50 during their assembly, and facilitate complete coupling between the locking bolts 103, temporally coupled with the screw holes 104, and the screw taps 102.

The head part of the clamping screw 321 of the clamper 32 may be formed to face upwards perpendicularly to the floor of the reactor pool, namely in the direction opposite to the gravity. This allows workers above the water (on a crane above the water) with remote working to fix/detach the capsule main body 10 to/from the guiding pipe 30 by rotating the clamping screws 321 placed in the service water pool with the capsule-assembling tool 73 of a given length. Considering characteristics of these works, all coupling according to the present invention may be performed easily in remote modes from vertically high working places.

Figure 8:
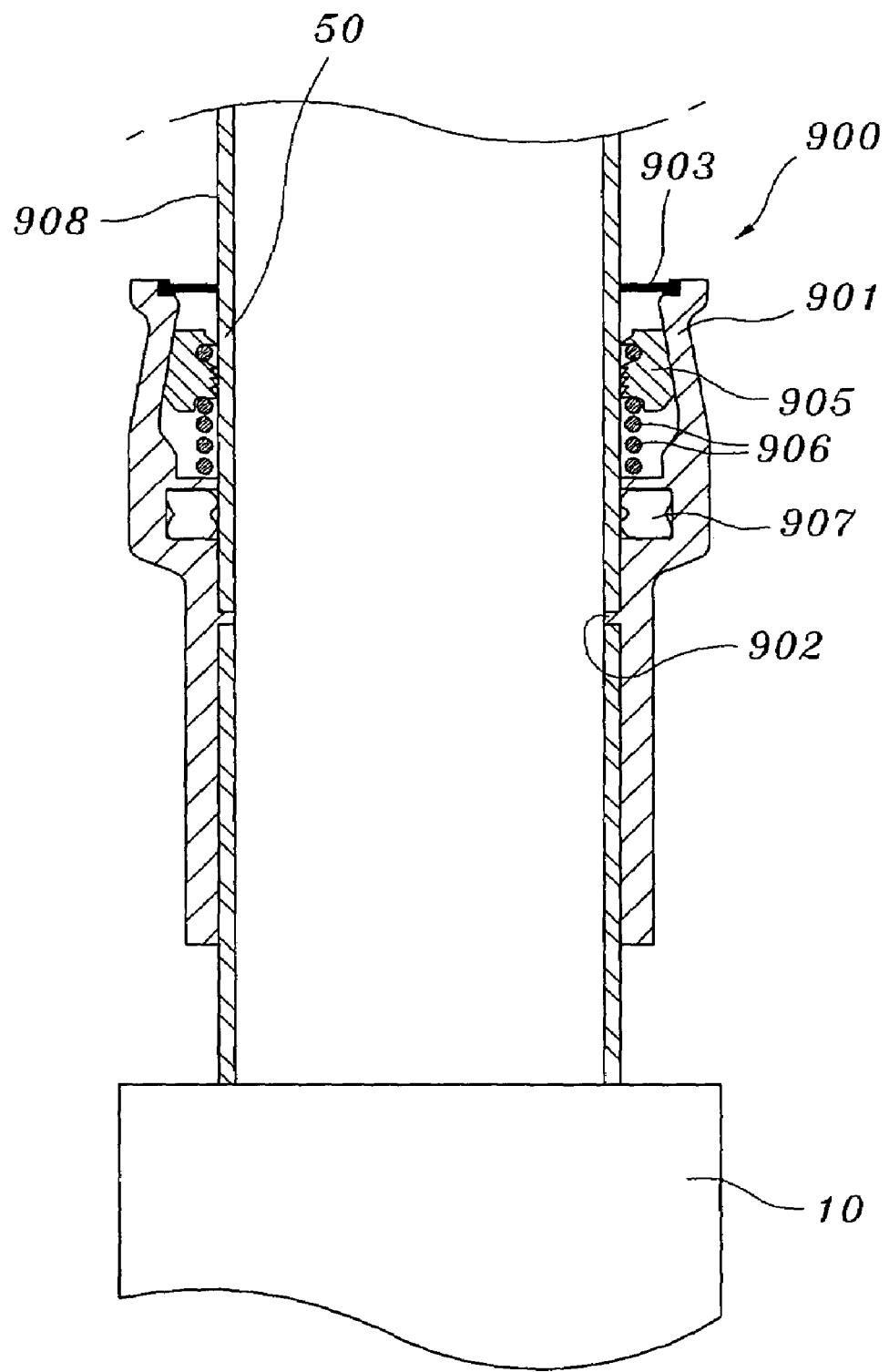
FIG. 8 is a sectional view showing an overview of another coupler coupling the capsule main body with the protection tube shown using a pipe joint according to an embodiment of the present invention.

FIG. 8 is a sectional view showing another coupler 900 of the capsule assembling apparatus 1 according to the present invention. The pipe coupler 900 according to an example embodiment may have a cylindrical shape on the capsule main body 10. The pipe coupler 900 may comprise a pipe joint holder 901, which has a stopping protrusion 902, a snap ring 903, a stopper 905, a wire spring 906, and a metallic gasket 907. The stopping protrusion 902 may be formed at the inner periphery of the pipe joint holder 901; and the snap ring 903, stopper 905, wire spring 906, and metallic gasket 907 may be formed sequentially downwards at the inner periphery thereof. The protection tube 50 may be inserted into the pipe joint holder 901 and combined with the capsule main body 10.

In the present example embodiment, one end of the pipe joint holder 901 may be combined with the capsule main body 10 via welding, and the protection tube 50 may be combined through the other end with the capsule main body 10 via pressure application. In reverse, one end of the pipe joint holder 901 may be combined with the protection tube 50 by welding, and the capsule main body 10 may be combined through the other end with the protection tube 50 via pressure application. With the stopping protrusions 902 formed at the inner periphery of the pipe joint holder 901, the protection tube 50 may be inserted from the upper end of the pipe joint holder 901 to the middle thereof.

Figure 9A:
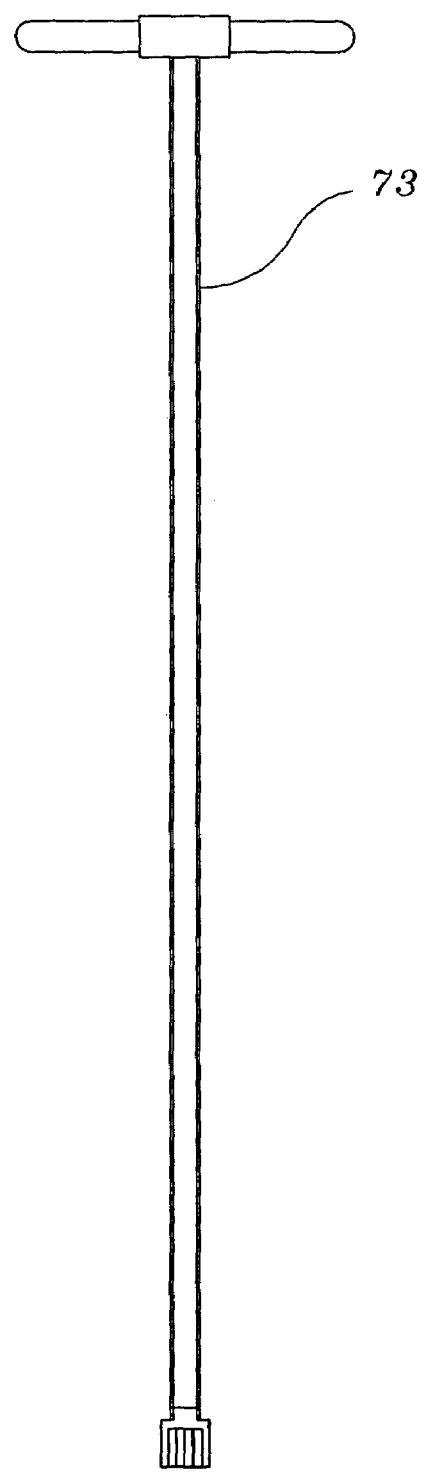
FIG. 9A is a schematic view showing a capsule fastening tool for the capsule assembling apparatus according to the present invention.
Figure 9B:
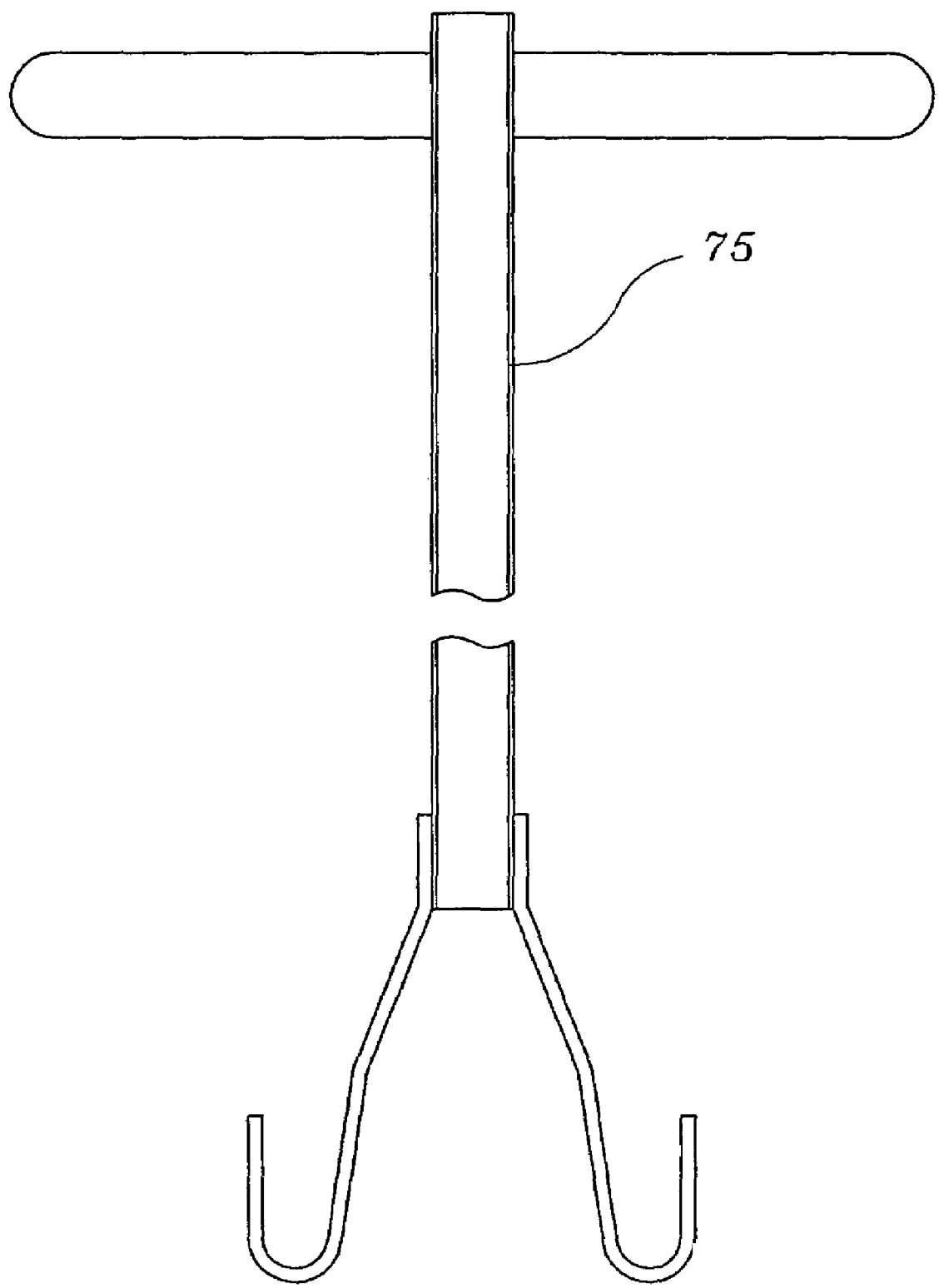
FIG. 9B is a schematic view showing a capsule transporting tool.
Figure 9C:
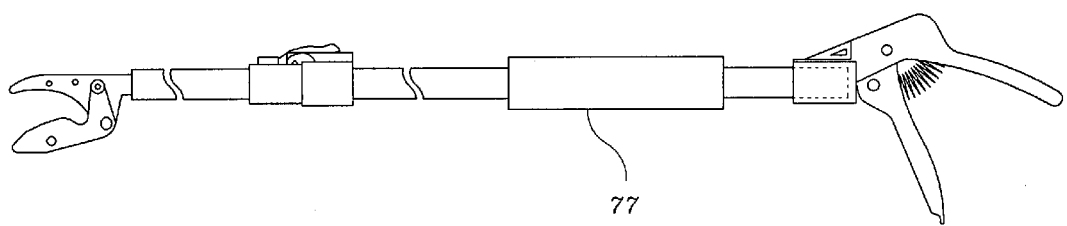
FIG. 9C is a schematic view showing an instrumentation line handling tool.

FIG. 9A is a schematic view showing the capsule fastening tool 73; FIG. 9B is a schematic view showing a capsule transporting tool 75; and FIG. 9C is a schematic view showing an instrumentation line handling tool 77. The capsule fastening tool 73, shown in FIG. 9A, may be used for coupling the locking bolt 103 through the screw hole 104 with the screw tap 102 by engaging with and rotating the head of the locking bolt 103. This tool 73 may also be used for forcing the jaw 324 to fix the capsule main body 10 by engaging with and rotating the head of the clamping screw 321 of the clamper 32. The capsule transporting tool 75, shown in FIG. 9B, may have two hooks in opposite directions, and be used for installing the capsule main body 10 within the guiding pipe 30 by hooking the capsule lug 11. The instrumentation line handling tool 77, shown in FIG. 9C, may have nippers and be used for taking out externally the instrumentation lines 71 via the instrumentation line hole 55. With these tools, the capsule may be assembled or transported.

FIG. 10 is a flowchart showing the steps to assemble a capsule using the capsule assembling apparatus 1 according to the present invention. When a capsule main body 10 is not reusable owing to the embrittlement of the structural material induced by the radiation, the capsule main body 10 may be transferred to a hot cell shielded with lead glass and concrete outside of the reactor, and test specimens 70 installed therein may be separated and taken out. The separated test specimens 70 may be transferred to and installed in a new capsule main body 10, which may be then transferred to an irradiation hole of the reactor.

Firstly, in a hot cell, instrumentation sensors and test specimens 70 may be installed within a capsule main body 10, and instrumentation lines 71 may be arranged for external connection. For convenience of working, instrumentation lines 71 may be tied together (step S1). The capsule main body 10 may be loaded in a transport cask and transported from the hot cell to a service water pool (step S2). The capsule main body 10 may be taken out from the transport cask and installed in a guiding pipe 30, and the capsule main body 10 may be fixed to the guiding pipe 30 by rotating clamping screws 321 of clampers 32 through remote working. Prior to this step, it may be necessary to install the guiding pipe 30 on a base structure 60 (step S3). The instrumentation lines 71, connected with the capsule main body 10, may be taken out through an instrumentation line hole 55 of a protection tube 50, which was transported from outside of the service water pool (step S4). The capsule main body 10 and protection tube 50 may be assembled together through remote working (step S5). The capsule fastening tool 73, capsule transporting tool 75, and instrumentation line handling tool 77 may be used for these steps. When the capsule is finally assembled, the capsule is separated from the guiding pipe 30. The assembled capsule may be transported from the service water pool to the research reactor for irradiation experiments (step S6). Finally, the transported capsule may be installed in a vertical irradiation hole and the experiments may be performed (step S7).

Accordingly, the capsule assembling apparatus and assembling method according to the present invention may have the following advantages. In assembly of a capsule for irradiation experiments to evaluate new nuclear fuel, the capsule main body and protection tube may be assembled/disassembled via clampers and a coupler, thereby enabling safe and easy assembly/disassembly of the capsule. In particular, for re-irradiation experiments requiring data on high burn-up performance or high neutron irradiation dosage, the capsule main body may be easily fixed to/released from a guiding pipe using clampers without welding, and the capsule main body and protection tube may be easily assembled with locking bolts of the coupler. In addition, clamping screws of the clampers and locking bolts of the coupler may be in an upright position, thereby enabling remote assembly/disassembly works above them using capsule assembling tools.

While example embodiments of the invention have been shown and described in this specification, it will be understood by those skilled in the art that various changes or modifications of the embodiments are possible without departing from the spirit of the invention as defined by the appended claims.

What is claimed is:

1. An apparatus for assembling a neutron re-irradiation capsule containing nuclear fuel specimens and at least one instrumentation sensor connected to external instrumentation and control systems via instrumentation lines, comprising a capsule main body and protection tube joined together, and to be neutron-irradiated in an irradiation hole of a reactor, the apparatus for joining the capsule main body and the protection tube together comprising:
   a base structure 60;
   a guiding pipe 30 of a length extending from the base structure to provide a pathway through which the capsule main body 10 is loaded on the base structure;
   a clamper 32 fixing the capsule main body to the guiding pipe; and
   a coupler 100, 900 coupling the capsule main body with the protection tube,
   wherein the clamper 32 fixes the capsule main body to the guiding pipe by converting a vertically applied force into a horizontal force, and the clamper comprises:
   a guiding pipe flange 31 formed at an upper end of the guiding pipe 30 and having at least one screw hole 311;
   a clamping screw 321 having a head to be inserted into an assembling tool 73, a screw part to be inserted into the at least one screw hole of the guiding pipe flange 31, and a slant surface 322 tapering from the head to the screw part with an angle;
   a push rod 323 contacting with the slant surface of the clamping screw 321, and moving towards the capsule main body in proportion to insertion of the screw part into the at least one screw hole 311 of the guiding pipe flange 31; and
   a jaw 324 formed at an end of the push rod 323 and moveable along the guiding pipe flange 31.

2. The apparatus for assembling a neutron re-irradiation capsule of claim 1, wherein the clamper further comprises a push rod guide 326 guiding a movement of the push rod 323.

3. The apparatus for assembling a neutron re-irradiation capsule as claimed in claim 1, wherein the push rod 323 has a round end contacting with the slant surface 322 of the clamping screw 321 and moves horizontally in proportion to fastening of the clamping screw 321.

4. The apparatus for assembling a neutron re-irradiation capsule of claim 1, wherein the protection tube has a flange 51 at a site interfacing with an upper surface of the capsule main body, and wherein the coupler comprises: at least one screw tap 102 formed at the upper surface of the capsule main body; screw holes 104 penetrating the flange of the protection tube and formed at a corresponding location to the screw taps 102; and locking bolts 103 joining the capsule main body and the protection tube by being inserted into the screw taps 102 through the screw holes 104.

5. The apparatus for assembling a neutron re-irradiation capsule of claim 4, wherein the coupler further comprises a plurality of guide pins 81 protruding from the upper surface of the capsule main body 10, and guide-pin holes 101 penetrating the flange 51 of the protection tube 50 at a corresponding location to the guide pins 81.

6. The apparatus for assembling a neutron re-irradiation capsule of claim 1, further comprising a gasket groove 109 formed in an upper surface of the capsule main body 10, and a gasket 108 to be inserted in the gasket groove 109.

7. The apparatus for assembling a neutron re-irradiation capsule of claim 1, wherein the coupler 900 is concentrically disposed about the protection tube 50 and comprises a pipe joint holder 901 having a first upper portion spaced from the protection tube and defining therewith a space which receives a snap ring 903, a stopper 905, a wire spring 906, and a metallic gasket 907 and installed sequentially in the space, and a second lower portion having an inner periphery including a stop protrusion 902, wherein the pipe joint holder 901 is fixed to the capsule main body and the protection tube 50.

8. An apparatus for assembling a neutron re-irradiation capsule containing at least one instrumentation sensor connected to external instrumentation equipment via instrumentation lines and nuclear fuel specimens, and to be neutron-irradiated in an irradiation hole, the apparatus for assembling the capsule comprising:
   a base structure;
   a guiding means of a length extending from the base structure to provide a pathway through which the capsule main body is loaded on the base structure;
   a clamper fixing the capsule main body to the guiding means; and
   a coupler coupling the capsule main body with a protection tube,
   wherein the clamper fixes the capsule main body to the guiding means by converting a vertically applied force into a horizontal force, and the clamper comprises:
   a flange formed at an upper end of the guiding means and having at least one screw hole;
   a clamping screw having a head to be inserted into an assembling tool, a screw part to be inserted into the at least one screw hole of the flange, and a slant surface tapering from the head to the screw part with an angle;
   a push rod contacting with the slant surface of the clamping screw, and moving towards the capsule main body in proportion to insertion of the screw part into the at least one screw hole of the flange; and
   a jaw formed at an end of the push rod and moveable along the flange.

* * * * *